United States Patent
Nawrocki et al.

(10) Patent No.: US 10,633,398 B2
(45) Date of Patent: *Apr. 28, 2020

(54) SYNTHESIS OF ZINC-LYSINE COMPLEX FROM ZINC CHLORIDE

(71) Applicant: Colgate-Palmolive Company, New York, NY (US)

(72) Inventors: Shiri Nawrocki, Tenafly, NJ (US); Ravi Subramanyam, Belle Mead, NJ (US); Long Pan, Cherry Hill, NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/319,756

(22) PCT Filed: Jun. 18, 2014

(86) PCT No.: PCT/US2014/042948
§ 371 (c)(1),
(2) Date: Dec. 17, 2016

(87) PCT Pub. No.: WO2015/195118
PCT Pub. Date: Dec. 23, 2015

(65) Prior Publication Data
US 2017/0121351 A1    May 4, 2017

(51) Int. Cl.
*C07F 3/06* (2006.01)
*C07F 3/00* (2006.01)

(52) U.S. Cl.
CPC ............... *C07F 3/06* (2013.01); *C07F 3/003* (2013.01); *C07B 2200/13* (2013.01)

(58) Field of Classification Search
CPC .......... C07F 3/003; C07F 3/06; C07F 13/005
See application file for complete search history.

(56) References Cited

U.S. PATENT DOCUMENTS

| | | | |
|---|---|---|---|
| 4,764,633 A | 8/1988 | Anderson et al. | |
| 5,061,815 A | 10/1991 | Leu | |
| 6,632,421 B2 | 10/2003 | Ascione et al. | |
| 8,741,375 B2 | 6/2014 | Stark | |
| 9,498,421 B2 | 11/2016 | Liu et al. | |
| 9,504,858 B2 | 11/2016 | Yuan et al. | |
| 9,718,843 B2 * | 8/2017 | Fitzgerald | C07F 3/06 |
| 2014/0170086 A1 | 6/2014 | Pan et al. | |
| 2015/0313821 A1 | 11/2015 | Yuan et al. | |
| 2015/0313822 A1 | 11/2015 | Pan et al. | |
| 2015/0313827 A1 | 11/2015 | Hardy et al. | |
| 2015/0328095 A1 | 11/2015 | Pan et al. | |
| 2015/0328110 A1 | 11/2015 | Pan et al. | |
| 2015/0328111 A1 | 11/2015 | Liu et al. | |
| 2015/0328112 A1 | 11/2015 | Xu et al. | |
| 2015/0328117 A1 | 11/2015 | Pan et al. | |
| 2015/0328118 A1 | 11/2015 | Pan et al. | |
| 2015/0335552 A1 | 11/2015 | Liu et al. | |
| 2015/0335553 A1 | 11/2015 | Pan et al. | |
| 2015/0335554 A1 | 11/2015 | Pan et al. | |
| 2015/0342851 A1 | 12/2015 | Liu et al. | |

FOREIGN PATENT DOCUMENTS

| | | |
|---|---|---|
| WO | WO 2015/195118 | 12/2015 |
| WO | WO 2015/195124 | 12/2015 |

OTHER PUBLICATIONS

Hartwell et al., 1970, "Preparation and Characterization of Tyrosine and Lysine Metal Chelate Polyesters and Polyamides," J. of the American Chemical Society 92(5):1284-1289.

International Search Report and Written Opinion of the International Searching Authority in PCT/US2014/042948, dated Aug. 26, 2014.

Li Shunxin, et al., Synthesis and characterization of zinc L-lysinate chelate, Applied Chemical Industry, 36(12) Dec. 2007 1218-1221.

* cited by examiner

*Primary Examiner* — Pancham Bakshi

(57) ABSTRACT

The disclosure provides an improved synthesis for a zinc-lysine complex having the formula $[Zn(C_6H_{14}N_2O_2)_2Cl]^+$ $Cl^-$, in which zinc chloride is reacted with lysine, in aqueous solution. The disclosure also provides oral care and personal care compositions comprising the complex prepared by the synthesis, and methods of using these complexes and compositions.

15 Claims, No Drawings

SYNTHESIS OF ZINC-LYSINE COMPLEX FROM ZINC CHLORIDE

BACKGROUND

A zinc-lysine complex, sometimes referred to herein as ZLC and having the chemical structure $[Zn(C_6H_{14}N_2O_2)_2Cl]^+Cl^-$, has recently been described. See, e.g. International Patent Application Nos. PCT/US2012/70489 and PCT/US2012/70498, filed on 19 Dec. 2012. ZLC has the unusual property that under conditions of increasing dilution rather than going into or remaining in solution as the solution becomes more dilute, as would typically be the case for an ionic complex, the ZLC complex hydrolyzes, to provide a relatively insoluble zinc oxide precipitate. The ZLC is useful in antiperspirant products, as it precipitates under sweat conditions that can plug the pores and block sweat release. In the presence of protein, the ZLC will flocculate and plug the sweat glands. The zinc oxide precipitate can also inhibit odor-causing bacteria, making ZLC useful as a deodorant. ZLC is also useful in skin care products, for example liquid hand soap or body wash, providing controlled deposition of zinc oxide on the skin upon dilution and use, which has an antibacterial effect, and also may help protect against sun damage. Finally ZLC can be incorporated in oral care formulations, which upon use and dilution, provide a zinc oxide precipitate that is effective for inhibiting and treating dentinal hypersensitivity, dental caries, and enamel erosion and demineralization.

Prior syntheses of ZLC involved adding solid ZnO to a solution of lysine.HCl in water under near-neutral conditions; stirring for 12 hours; centrifugation to remove unreacted solids, and precipitation of ZLC by pouring the solution into ethanol. This procedure possess several disadvantages, including long reaction time, and extra steps for removal of the unreacted insoluble reagents, which results in excess amino acid in the final reaction mixture hindering product purity, in turn requiring further isolation with ethyl alcohol, and thus limiting feasibility on a large manufacturing scale. Thus, it can be seen that there is a need for improved methods for producing ZLC.

BRIEF SUMMARY

The disclosure provides synthetic methods for the production of ZLC. In some embodiments, the disclosure provides a synthetic method comprising combining zinc chloride ($ZnCl_2$) with lysine in aqueous solution, to form a complex, and isolating the complex.

Preferably, the molar ratio of $ZnCl_2$ to lysine is 1:1 to 1:3; for example 1:2. While a molar ratio in the range of 1:2 zinc chloride to lysine is preferred for formation of material which is pure or near pure ZLC, in some embodiments, it may be desirable to have an excess of zinc, so that the final product is a mixture of ZLC and other zinc species. Thus in some embodiments, the molar ratio of the zinc chloride to the lysine is 2:1 to 1:2. In some embodiments, the zinc chloride is available in sufficient molar amount to form ZLC, and an additional less soluble zinc species, e.g., zinc oxide, is also provided, as a an additional reservoir of zinc in the formulation.

The formation of the ZLC complex from $ZnCl_2$ and lysine is faster and more efficient than prior synthetic procedures.

DETAILED DESCRIPTION

The following description of the preferred embodiment(s) is merely exemplary in nature and is in no way intended to limit the disclosure, its application, or uses.

The disclosure therefore provides, in a first embodiment, a synthetic method (Method 1) which comprises the step of combining a zinc chloride with lysine, in aqueous solution, e.g., 1.1. Method 1, wherein the method further comprises isolating the complex.
1.2. Any of the foregoing methods, wherein the complex is isolated by precipitating the complex from aqueous ethanol.
1.3. Any of the foregoing methods, wherein the molar ratio of zinc chloride to lysine is 1:1 to 1:3.
1.4. Any of the foregoing methods, wherein the molar ratio of zinc chloride to lysine is 1:2.
1.5. Any of the foregoing methods, wherein combining the zinc chloride with lysine is performed by the steps of a) preparing an aqueous solution comprising the lysine; and b) adding the zinc chloride to the solution; to form a reaction mixture.
1.6. Any of the foregoing methods, further comprising waiting a period of time sufficient to allow a zinc-lysine complex of formula $[Zn(C_6H_{14}N_2O_2)_2Cl]^+Cl^-$ to form.
1.7. Any of the foregoing methods, further comprising the step of isolating a zinc-lysine complex of formula $[Zn(C_6H_{14}N_2O_2)_2Cl]^+Cl^-$ from the reaction mixture.
1.8. Method 1.7, wherein the isolation comprises crystallization from aqueous ethanol.
1.9. Method 1.7, wherein the isolation comprises precipitation from aqueous ethanol.
1.10. Any of the foregoing methods, wherein the % solids in the reaction mixture is from 10%-60%.
1.11. Any of the foregoing methods, wherein the method is performed at ambient temperature.
1.12. Any of the foregoing methods, wherein the method is performed at a pH of 5 to 6.

In a further embodiment, the disclosure provides a zinc-lysine complex (Complex 2) formed by any of the Methods 1-1.11. For example, the disclosure provides:

2.1. Complex 2, in crystalline form.
2.2. Complex 2, in the form of a hydrate.
2.3. Complex 2, in the form of a hydrate having the formula $[Zn(Lysine)_2Cl]Cl.H_2O$.
2.4. Complex 2, having a structure wherein the Zn cation is coordinated by two lysine ligands with two nitrogen atoms from alpha $NH_2$ groups of the two lysine ligands and two oxygen atoms from carboxylic groups of the two lysine ligands in an equatorial plane, having a distorted square-pyramidal geometry with the apical position occupied by a chlorine atom, to form a positive cation moiety, with which a chloride anion is combined to form an ionic salt.

The disclosure further provides a personal care composition (Composition 1) for application to the skin which comprises any of Complexes 2, et seq., in combination with a cosmetically acceptable carrier.

The disclosure further provides methods of reducing perspiration comprising applying an antiperspirant effective amount of any of Complexes 2, et seq., to the skin, methods of reducing body odor comprising applying a deodorant-effective amount of any of Complexes 2 et seq., to the skin, and methods of killing bacteria comprising contacting the bacteria with an antibacterially effective amount of any of Complexes 2 et seq.

The disclosure further provides (i) the use of any of Complexes 2 et seq., to kill bacteria, reduce perspiration, and/or reduce body odor; (ii) the use of any of Complexes 2 et seq., in the manufacture of a composition to kill bacteria, reduce perspiration, and/or reduce body odor; and (iii) any of Complexes 2 et seq., for use in killing bacteria, reducing perspiration, and/or reducing body odor.

The disclosure further provides an oral care composition (Composition 2), e.g., a toothpaste or a mouth rinse, which comprises any of Complexes 2-2.6, e.g., which upon use and dilution, provides a zinc oxide precipitate that is effective for inhibiting and/or treating an indication selected from dentinal hypersensitivity, dental caries, and enamel erosion and demineralization.

In another embodiment, the disclosure provides methods of inhibiting and/or treating an indication selected from dentinal hypersensitivity, dental caries, and enamel erosion and demineralization, comprising applying Composition 2 or an effective amount of any of Complexes 2-2.6 to the teeth. The disclosure further provides (i) the use of any of Complexes 2-2.6, for inhibiting and/or treating an indication selected from dentinal hypersensitivity, dental caries, and enamel erosion and demineralization; (ii) the use of any of Complexes 2-2.6, in the manufacture of a composition for inhibiting and/or treating an indication selected from dentinal hypersensitivity, dental caries, and enamel erosion and demineralization.

It has been discovered in accordance with the present disclosure that ZLC can be prepared by reacting a zinc chloride with lysine in aqueous solution. The methods of the disclosure provide ZLC having improved reaction time and efficiency as compared to prior synthetic procedures wherein ZnO is reacted with lysine.HCl.

Generally, the molar ratio of the zinc chloride to lysine is from 1:1 to 1:3; preferably approximately 1:2.

Typically, an aqueous solution of lysine is prepared, and $ZnCl_2$ is then added to the solution. While not wishing to be bound by any particular theory, it is believed that performing the reaction using the more soluble salt $ZnCl_2$ will result in more rapidly solubilization of zinc ion, thus decreasing reaction time.

The reaction can be performed at a variety of temperature conditions. Typically, it is most convenient to perform the reaction at ambient temperature, i.e., approximately 25° C. The reaction is typically allowed to proceed for approximately 12 hours.

Isolation of the ZLC complex can be accomplished by crystal growth in ethanol, or by pouring the reaction mixture into aqueous ethanol and collecting the resulting precipitate as a powder.

It will be understood that, although the ZLC may be primarily in the form of a complex, there may be some degree of equilibrium with the zinc compound (zinc oxide or zinc chloride) and the lysine compound (lysine or lysine hydrochloride) precursor materials, so that the proportion of material which is actually in complex compared to the proportion in precursor form may vary depending on the precise conditions of formulation, concentration of materials, pH, presence or absence of water, presence or absence of other charged molecules, and so forth.

ZLC, e.g., any of Complex 2, et seq., can be incorporated into a suitable base, for example a stick, roll-on, spray or aerosol for application to the underarm. Following application, the ZLC in the presence of charged molecules such as proteins found on the skin, the ZLC has a low zeta potential, and will flocculate, forming plugs which block sweat release. Additional water from sweat can moreover dilute the formulation, causing the complex to decompose, resulting in precipitation of zinc oxide, which can reduce sweat and odor as described above. Similarly, if the ZLC is provided in a hand soap or body wash base, the dilution of the ZLC upon washing results in a thin deposition of zinc oxide on the skin, providing an antibacterial effect.

As used herein, the term antiperspirant can refer to any material that can form a plug in a pore to reduce sweating, or antiperspirant refers to those materials classified as antiperspirants by the Food and Drug Administration under 21 CFR part 350. Antiperspirants may also be deodorants, particularly in the case of this disclosure, as zinc has antibacterial properties and can reduce odor-causing bacteria on the skin.

The composition can include the ZLC, e.g., any of Complex 2, et seq. and/or precursors thereof, for example zinc oxide, zinc chloride, lysine and lysine hydrochloride. In one embodiment, the ZLC is prepared at room temperature by mixing the precursors in an aqueous acidic solution. The in situ formation provides ease of formulation. The precursors can be used instead of first having to form the ZLC. In another embodiment, the water permitting formation of the ZLC, e.g., any of Complex 2, et seq. from the precursor comes from sweat that comes into contact with the composition after application.

In certain embodiments, the amount of ZLC, e.g., any of Complex 2, et seq. in the composition of the disclosure, e.g., Compositions 1, is 0.05 to 10% by weight of the composition. In certain embodiments, precursors, e.g., zinc oxide and lysine hydrochloride, are present in amounts such that when combined into the ZLC, e.g., any of Complex 2, et seq., the ZLC, e.g., any of Complex 2, et seq. would be present in an amount of 0.05 to 10% by weight of the composition. In either of these embodiments, the amount of the ZLC, e.g., any of Complex 2, et seq. can be varied for the desired purpose, such as an antibacterial agent or as an antiperspirant. In other embodiments, the amount of the ZLC, e.g., any of Complex 2, et seq. is at least 0.1, at least 0.2, at least 0.3, at least 0.4, at least 0.5, at least 1, at least 2, at least 3, or at least 4 up to 10% by weight of the composition. In other embodiments, the amount of the ZLC, e.g., any of Complex 2, et seq. is less than 9, less than 8, less than 7, less than 6, less than 5, less than 4, less than 3, less than 2, less than 1, less than 0.5 to 0.05% by weight of the composition. In other embodiments, the amounts are 0.05 to 5%, 0.05 to 4%, 0.05 to 3%, 0.05 to 2%, 0.1 to 5%, 0.1 to 4%, 0.1 to 3%, 0.1 to 2%, 0.5 to 5%, 0.5 to 4%, 0.5 to 3%, or 0.5 to 2% by weight of the composition.

In some embodiments, the total amount of zinc in the composition is 0.05 to 8% by weight of the composition. In other embodiments, the total amount of zinc is at least 0.1, at least 0.2, at least 0.3, at least 0.4, at least 0.5, or at least 1 up to 8% by weight of the composition. In other embodiments, the total amount of zinc in the composition is less than 5, less than 4, less than 3, less than 2, or less than 1 to 0.05% by weight of the composition.

In certain embodiments, the composition is anhydrous. By anhydrous, there is less than 5% by weight water, optionally less than 4, less than 3, less than 2, less than 1, less than 0.5, less than 0.1 down to 0% by weight water.

When provided in an anhydrous composition, precursors, e.g., zinc oxide and lysine hydrochloride, will not significantly react to form the ZLC, e.g., any of Complex 2, et seq. When contacted with a sufficient amount of water, which can be in the form of sweat, the precursors will then react to form the ZLC, e.g., any of Complex 2, et seq. The ZLC, e.g., any of Complex 2, et seq. when introduced into a sweat duct will flocculate with protein and/or hydrolyze with water and/or sweat to form a precipitate to block the sweat duct.

In certain embodiments, the ZLC, e.g., any of Complex 2, et seq. can have a zeta potential on the order of +10 to +60, e.g., between +20 and +50. Zeta potential is measured as described below. The zeta potential indicates the degree of repulsion between adjacent, similarly charged particles in a dispersion. For molecules and particles that are small enough to be influenced by van der Waals forces, a high zeta potential will tend to confer stability, i.e., the particles will tend to repel one another, and the solution or dispersion will resist aggregation. When the zeta potential is low, attraction exceeds repulsion and the dispersion will break and flocculate. Here, it is desirable to have a zeta potential that is high enough in formulation to deter aggregation, but low enough to allow flocculation and blockage of the pores. As shown in the examples below, the ZLC, e.g., any of Complex 2, et seq. has a zeta potential similar to aluminum chlorohydrate antiperspirants. Having a similar zeta potential, the ZLC, e.g., any of Complex 2, et seq. will behave similarly and flocculate when introduced into a pore and becomes hydrated. In contrast, zinc chloride has a zeta potential of about 0, which is much lower than current antiperspirant salts and the current disclosure.

In certain embodiments, the ZLC, e.g., any of Complex 2, et seq. can have a conductivity of greater than 8000, optionally greater than 9000, greater than 10,000, or greater than 12,000 μS/cm The composition can be any type of composition. In certain embodiments, the composition is any composition in which it is desired to include an antibacterial agent for application to the skin. Examples of such compositions include, but are not limited to, personal care compositions, antiperspirants, deodorants, body washes, shower gels, bar soaps, shampoo, hair conditioners, and cosmetics.

The carrier represents all other materials in the composition other than the ZLC, e.g., any of Complex 2, et seq. or the zinc oxide and amino acid hydrohalide. The amount of carrier is then the amount to reach 100% by adding to the weight of the ZLC, e.g., any of Complex 1, et seq. or the zinc oxide and amino acid hydrohalide.

For antiperspirant/deodorant compositions, the carrier can be any carrier that is used for antiperspirants/deodorants. The carrier can be in the form of a stick, a gel, a roll-on, or an aerosol. For stick formulations, the carrier may include oils and/or silicones and gelling agents. An example of a formulation can be found in US2011/0076309A1, incorporated by reference herein.

Optional ingredients that can be included in an antiperspirant and/or deodorant formulation of the compositions of the disclosure include solvents; water-soluble alcohols such as $C_{2-8}$ alcohols including ethanol; glycols including propylene glycol, dipropylene glycol, tripropylene glycol and mixtures thereof; glycerides including mono-, di- and tri-glycerides; medium to long chain organic acids, alcohols and esters; surfactants including emulsifying and dispersing agents; amino acids including glycine; structurants including thickeners and gelling agents, for example polymers, silicates and silicon dioxide; emollients; fragrances; and colorants including dyes and pigments. If desired, an antiperspirant and/or deodorant agent additional to the ZLC, e.g., any of Complex 2, et seq. can be included, for example an odor reducing agent such as a sulfur precipitating agent, e.g., copper gluconate, zinc gluconate, zinc citrate, etc.

The antiperspirant compositions can be formulated into topical antiperspirant and/or deodorant formulations suitable for application to skin, illustratively a stick, a gel, a cream, a roll-on, a soft solid, a powder, a liquid, an emulsion, a suspension, a dispersion or a spray. The composition can comprise a single phase or can be a multi-phase system, for example a system comprising a polar phase and an oil phase, optionally in the form of a stable emulsion. The composition can be liquid, semi-solid or solid. The antiperspirant and/or deodorant formulation can be provided in any suitable container such as an aerosol can, tube or container with a porous cap, roll-on container, bottle, container with an open end, etc.

The compositions can be used in a method to reduce sweating by applying the composition to skin. In certain embodiments, the application is to axilla. Also, the compositions can be used to kill bacteria by contacting bacteria with the composition. For example, in one embodiment, the combination of the amino acid or amino acid hydrohalide with the zinc oxide increases the availability of zinc ions, which can then kill bacteria and reduce sweat.

Thus the disclosure provides (i) a method for controlling perspiration comprising applying to skin an antiperspirant effective amount of a formulation of any embodiment embraced or specifically described herein, e.g., any of Compositions 1 et seq.; and (ii) a method for controlling odor from perspiration comprises applying to skin a deodorant effective amount of a formulation of any embodiment embraced or specifically described herein, e.g., any of Compositions 1 et seq.

In another embodiment, the disclosure provides oral care formulations, e.g., Composition 2, for example a toothpaste, gel, mouthwash, powder, cream, strip, or gum comprising an effective amount of the ZLC of the disclosure, e.g., any of Complex 2, et seq.

If the actives are delivered in the form of a mouthwash, a person desiring the benefits rinses with the stock solution and natural dilution of the stock solution by saliva will initiate the precipitation of the zinc. Alternatively, the person can mix the stock solution with appropriate amount of an aqueous diluent (such as approximately 1 part stock solution and 8 parts water for the zinc-lysine samples), and rinse with the mixture.

In another embodiment, the mixture is prepared and immediately transferred into a retaining tray, such as those used in holding whitening gels, and the person can wear the tray for the effective period of time. The teeth that are in contact with the mixture will be treated. For use with retaining tray, the mixture can be in the form of a low-viscosity liquid or a gel.

In another embodiment, the stock solution, or a mixture of stock solution with water, is applied to the teeth in a gel formulation, e.g., wherein the gel can stay on the tooth for an extended period of time for effective treatment.

In another embodiment, the ZLC active is provided in a toothpaste. Upon brushing, the active is diluted by saliva and water, leading to precipitation and the formation of deposits and occluding particles.

The rate of precipitation from the formulation can be modulated by adjusting concentration of the complex in the stock solution, and changing the ratio of the stock to water. A more diluted formula leads to faster precipitation and is thus preferred when a fast treatment is desired.

The benefits of the oral care compositions of the disclosure are numerous. By providing zinc ions and zinc containing compounds that can release zinc ions in oral cavities, the oral care compositions of the disclosure provide antimicrobial, antiplaque, antigingivitis, anti-malodor, anticaries, and anticalculus benefits. The occluding particles and the surface deposits are compounds containing zinc (particularly ZnO), as well as other zinc derivatives which can release zinc ions into oral cavities and provide the various benefits as recognized above. Additional benefits include but are not limited to anti-attachment, anti-periodontitis and anti-bone loss, as well as promotion of wound healing.

A second benefit is the antierosive properties of zinc ions, which form antierosive deposits on tooth surfaces through oxidation and hydrolysis. The surface deposits, as well as the occluding particles, can react with and neutralize acids, thus protecting the dental surface from the erosive effects of the acids. In this regard, the more surface depositions/occlusion the treatments lead to, the more efficacious the treatments are, and therefore zinc-arginine and zinc-lysine are preferred. It is also noted that when the surface deposits and occluding particles neutralize acids, beneficial zinc ions and the basic amino acid, lysine, are released, providing oral care benefits other than anti-erosion.

A third benefit is anti-sensitivity benefit as a result of the occlusion. Occlusion of dentin tubules leads to sensitivity relief.

A fourth benefit is the benefit associated with the lysine. The occluding particles and surface deposits contain not only zinc, but also lysine, which provides multiple benefits. For example, the basic amino acid leads to higher pH of the plaque and can provide anticaries benefits.

Unless stated otherwise, all percentages of composition components given in this specification are by weight based on a total composition or formulation weight of 100%.

Unless otherwise specifically identified, the ingredients for use in the compositions and formulations of the present disclosure are preferably cosmetically acceptable ingredients. By "cosmetically acceptable" is meant suitable for use in a formulation for topical application to human skin. A cosmetically acceptable excipient, for example, is an excipient which is suitable for external application in the amounts and concentrations contemplated in the formulations of this disclosure, and includes for example excipients which are "Generally Recognized as Safe" (GRAS) by the United States Food and Drug Administration.

The compositions and formulations as provided herein are described and claimed with reference to their ingredients, as is usual in the art. As would be evident to one skilled in the art, the ingredients may in some instances react with one another, so that the true composition of the final formulation may not correspond exactly to the ingredients listed. Thus, it should be understood that the disclosure extends to the product of the combination of the listed ingredients.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

Example 1—Synthesis and Characterization of Zinc-Lysine Complex ZLC

In accordance with the methods of the disclosure, zinc chloride ($ZnCl_2$) is reacted with lysine in aqueous solution. The general reaction for the formation of ZLC in accordance with the present disclosure is as follows:

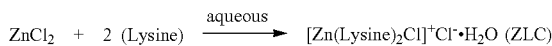

A 1:2 molar ratio of $ZnCl_2$:Lysine suspension is prepared with stirring at room temperature for about 12 hours. The mixture is centrifuged. 1 ml of supernatant is transferred into an NMR tube. The NMR tube is then placed in a closed test tube filled with ethanol for crystal growth. A number of cubic crystals are formed after a week. The crystal structure of ZLC crystal is determined by single crystal X-ray diffraction. The results show the empirical formula to be $C_{12}H_{32}N_4O_6Cl_2Zn$ with molecular weight of 464.9 g/mol. The dimension of this complex molecule is 0.4×0.3×0.15 $nm^3$.

In this complex, Zn cation is coordinated by two lysine ligands with two N atoms from $NH_2$ groups and O atoms from carboxylic groups in an equatorial plane. It displays a distorted square-pyramidal geometry with the apical position occupied by a Cl atom. The structure gives rise to a positive cation moiety, to which a Cl anion is combined to form an ionic salt.

Laboratory Scale-Up Synthesis of Pure ZLC Powder:

2 moles of lysine is dissolved in 1000 ml DI water with stirring at room temperature. Solid $ZnCl_2$ (1 mole) is added slowly to the lysine solution with stirring and the stirring is continued at RT overnight (about 12 hours). The suspension solution is centrifuged at high speed for 15 mins. The supernatant is slowly poured into EtOH. A precipitate is formed immediately. Approximately 5-8 ml EtOH is needed to obtain 1 g powder. The EtOH solvent with powder is filtered, and an off-white powder is obtained. The powder is placed in a 50° C. oven for drying and an 88% yield of product is obtained.

Powder X-ray diffraction (PXRD) spectra of the ZLC obtained by the procedure utilizing ZnO and lysine.HCl reagents, and the foregoing procedure of the disclosure, show that the products of the two synthetic procedures are identical.

We claim:

1. A synthetic method comprising the steps of (1) combining zinc chloride with lysine, in aqueous solution, to form a complex; (2) waiting a period of time sufficient to allow a zinc-lysine complex of formula $[Zn(C_6H_{14}N_2O_2)_2Cl]^+Cl^-$ to form; and (3) isolating the complex;
   wherein the lysine is not lysine hydrochloride;
   wherein the zinc-lysine complex has a structure wherein the Zn cation is coordinated by two lysine ligands with two nitrogen atoms from alpha $NH_2$ groups of the two lysine ligands and two oxygen atoms from carboxylic groups of the two lysine ligands in an equatorial plane, having a distorted square-pyramidal geometry with the apical position occupied by a chlorine atom, to form a positive cation moiety, with which a chloride anion is combined to form an ionic salt; and
   wherein the combination of step (1) is performed at a pH of 5 to 6.

2. The method of claim 1, wherein the lysine is lysine free base.

3. The method of claim 1, wherein the complex is isolated by precipitating the complex from aqueous ethanol.

4. The method of claim 1, wherein the molar ratio of zinc chloride to the lysine is 1:1 to 1:3.

5. The method of claim 1, wherein the molar ratio of zinc chloride to the lysine is 1:2.

6. The method of claim 1, wherein step (1) consists of adding zinc chloride to an aqueous solution consisting of lysine and water to form a reaction mixture.

7. The method of claim 6, wherein step (3) is isolating the zinc-lysine complex of formula $[Zn(C_6H_{14}N_2O_2)_2Cl]^+Cl^-$ from the reaction mixture.

8. The method of claim 7, where the isolation comprises crystallization from aqueous ethanol.

9. The method of claim 7, where the isolation comprises precipitation from aqueous ethanol.

10. The method of claim 1, wherein the % solids in the combination of step (1) is from 10%-60%.

11. The method of claim 1, wherein the method is performed at ambient temperature.

12. A synthetic method comprising the steps of (1) forming an aqueous solution consisting of zinc chloride and lysine; (2) waiting a period of time sufficient to allow a zinc-lysine complex of formula $[Zn(C_6H_{14}N_2O_2)_2Cl]^+Cl^-$ to form in the aqueous solution; and (3) isolating the complex from the aqueous solution;

wherein the zinc-lysine complex has a structure wherein the Zn cation is coordinated by two lysine ligands with two nitrogen atoms from alpha $NH_2$ groups of the two lysine ligands and two oxygen atoms from carboxylic groups of the two lysine ligands in an equatorial plane, having a distorted square-pyramidal geometry with the apical position occupied by a chlorine atom, to form a positive cation moiety, with which a chloride anion is combined to form an ionic salt; and wherein step (1) is performed at a pH of 5 to 6.

13. The method of claim 12, wherein the molar ratio of zinc chloride to lysine is about 2:1.

14. The method of claim 12, wherein the reaction is performed at room temperature for about 12 hours.

15. The method of claim 12, wherein step (1) consists of adding zinc chloride to an aqueous solution consisting of lysine and water.

\* \* \* \* \*